United States Patent Office 3,644,488
Patented Feb. 22, 1972

3,644,488
SUBSTITUTED β,β'-THIO DIETHYL SULFONES
Albert C. Perrino, Cravston, and Michael G. Israel, Bristol, R.I., assignors to I.C.I. Organics Inc., Providence, R.I.
No Drawing. Original application Oct. 26, 1966, Ser. No. 589,529, now Patent No. 3,479,408. Divided and this application Apr. 10, 1969, Ser. No. 815,202
Int. Cl. C07c *149/20*
U.S. Cl. 260—481 R  6 Claims

ABSTRACT OF THE DISCLOSURE

A novel class of sulfones useful as stabilizers in polyolefin compositions and polyolefin compositions made from the same. The sulfones have the formula

 or

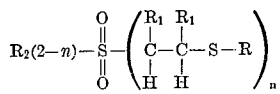

This is a division of our prior U.S. patent application Ser. No. 589,529 filed Oct. 26, 1966, now Pat. 3,479,408, the disclosure of which is incorporated herein by reference.

BACKGROUND OF THE INVENTION

Polyolefin polymers, such as polyethylene, polypropylene, polybutene-1, poly-3-methyl-butene-1, poly-4-methyl pentene-1, ethylene/propylene copolymers and the like are commonly subjected to elevated temperature in the course of processing or fabrication into useful articles. Certain processing methods, such as rolling, injection molding, extrusion and the like are generally at elevated temperatures and usually result in oxidative degradation of such polyolefins. In addition, many uses of polyolefins, such as in electrical insulation and the like, often expose the polyolefin polymers to elevated service temperatures. To minimize oxidative deterioration in polyolefins, antioxidants or stabilizers are generally incorporated therein. Thioethers have been frequently used as polyolefin stabilizers, generally in combination with phenolic antioxidants.

The thioethers used by the prior art, such as thiodialkanoic acid esters, tend to cause molecular weight reduction of polyolefins such as polypropylene at high temperatures encountered during fabrication. The degradation is evidenced by a substantial increase in melt flow rate of the polymer and becomes a limiting factor with regard to the amount of thioether which can be used. As a result, the most effective combination of oxidative stabilizers cannot generally be used.

When the term "polyolefin" is used in this specification it refers to solid poly-α-olefins, preferably containing from 2 to 10 carbon atoms, and of both the so-called "low density" and "high density," or high crystallinity, types. Additional examples of polyolefins are poly (pentene-1), poly (3,3-dimethyl butene-1), poly (4,4-dimethyl butene-1), poly (octene-1), poly (decene-1), and the like, although this listing is not to be construed to limit the scope of the present invention. Generally, the solid polyolefins will have an average molecular weight of 15,000 and more usually at least 20,000 although the present invention may also be used to stabilize the so-called poly-α-olefin waxes having lower average molecular weight, generally of the order of 3,000 to 12,000.

OBJECTS OF THE INVENTION

It is an object of the present invention to provide, as a novel class of thioethers, β-thioethyl sulfones. It is an additional object of this invention to provide a process for the production of β-thioethyl sulfones. Yet other objects of this invention are to provide, as preferred compounds, β,β'-dithioethyl sulfones and the process for making the same.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes or modifications within the scope of the invention will become apparent to those skilled in the art from this detailed description.

SUMMARY OF THE INVENTION

It has been found that the β-thioethyl sulfones and especially the β,β'-dithioethyl sulfones, of this invention, exhibit superior heat and antioxidant effects when incorporated in polyolefin compositions, either alone or in combination with conventional hindered phenolic antioxidants. The superior heat and oxidative stabilizing efficiencies of β-thioethyl sulfones and especially the β,β'-dithioethyl sulfones is manifested by (a) increased life of the polyolefin at elevated temperatures and (b) less degradation of the polyolefin during processing at elevated temperatures. This is a very important property as this allows the thio antioxidant to be incorporated at higher concentrations, thereby affording the most effective stabilization.

The β'-thioethyl sulfones and β,β'-dithioethyl sulfones of this invention are prepared by reacting allyl sulfones, vinyl sulfones, or precursors to vinyl sulfones, e.g. β,β'-dihydroxyethyl sulfone, with mercaptans under alkaline conditions.

DESCRIPTION OF THE INVENTION

The preferred sulfones of this invention will have either Formula I or Formula II:

FORMULA I

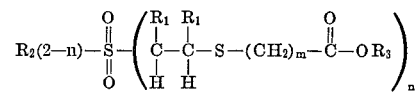

wherein $R_3$ is independently selected from the group consisting of hydrogen atoms, alkaline earth metals, alkali metals, alkyl radicals of from 6 to 22 carbon atoms in length, alkaryl radicals, and aryl radicals, and $R_2$ is an alkyl radical of from 6 to 22 carbon atoms in length, an alkaryl radical, an aralkyl radical or an aryl radical and each $R_1$ is independently selected from the group consisting of hydrogen atoms, alkyl radicals of from 1 to 4 carbon atoms in length and aryl radicals, $n$ is 1 or 2 and $m$ is 1 to 4. When $n$ is 2, each R and each $m$ may be the same or different.

FORMULA II

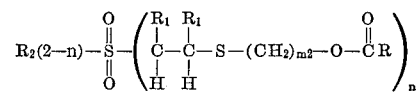

wherein $R_2$ and R are independently selected from the group consisting of alkyl radicals of from 6 to 22 carbon atoms in length, alkaryl radicals, aralkyl radicals, and aryl radicals and each $R_1$ is an alkyl radical of from 1 to 4 carbon atoms in length, or an aryl radical, $n$ is 1 to 2, and $m_2$ is 2 to 6. When $n$ is 2, each R and each $m_2$ may be the same or different.

When the term "β-thioethyl sulfone" is used in this specification, it is to be construed to generically mean both β-thioethyl sulfone and β,β'-dithioethyl sulfone.

Examples of alkyl radicals of 6 to 22 carbon atoms represented by R in the above formulas are dodecyl, tetradecyl, hexadecyl, octadecyl, hexyl, octyl, nonyl, decyl, etc. Examples of alkaryl radicals represented by R are 4-t-butyl phenyl, m- and p-tolyl, xylyl, etc. Examples of aryl radicals represented by R are phenyl, naphthyl, etc. Examples of aralkyl radicals represented by R are benzyl, phenylethyl, etc. Suitable examples of radicals represented by $R_2$ include those listed above as represented by R.

Examples of alkyl radicals represented by $R_1$ are methyl, ethyl, n-propyl, i-propyl, n-butyl, s-butyl, and t-butyl. Examples of aryl radicals represented by $R_1$ are phenyl, naphthyl, etc.

The preferred thioethers of this invention are β,β'-dithioethyl sulfones.

The β-(carboxyalkylthio)ethyl sulfones of Formula II may be prepared by reacting the vinyl sulfone with a mercapto-alkyl acid of 1 to 5 carbon atoms in length. The β-carboxyalkyl thioethyl sulfone or β,β'-bis (carboxyalkylthio) diethyl sulfonate may be subsequently esterified with an alcohol of the formula ROH wherein R is an alkyl radical of from 6 to 22 carbon atoms in length, and alkaryl radical, or an aryl radical.

β-(Hydroxyalkylthio) ethyl sulfones may be prepared by reacting the vinyl sulfone with a mercapto-alkyl alcohol of 2–6 carbon atoms in length. The resulting β-(hydroxyalkylthio) ethyl sulfone or β,β'-bis (hydroxyalkylthio) diethyl sulfone may subsequently be used to esterify carboxylic acids of the formula RCOOH wherein R is an alkyl radical of from 1 to 22 carbon atoms in length, an alkaryl radical or an aryl radical.

Conventional catalysts, such as sodium metal or sodium salts, may be used in the reaction of the vinyl sulfone with the mercaptan, as is known to those of ordinary skill in the art. Alternatively, if no catalyst is present, a higher reaction temperature may be used.

While the mole ratio of the vinyl sulfone to the mercaptan is preferably 1:1 to produce β-thioethyl sulfones, and preferably 1:2 to produce β,β'-dithioethyl sulfones, the mole ratios of vinyl sulfone: mercaptan may vary between 1 and 2 to produce a mixture of β-thioethyl and β,β'-dithioethyl sulfones.

The polyolefin compositions containing one or more of the polyolefins described in the section entitled "Background of the invention" are stabilized in accordance with the present invention by the incorporation of 0.001 to 5% by weight of the polyolefin of the β-thioethyl sulfone of the present invention. More preferably, the polyolefin composition contains 0.05 to 1.0% by weight of the polythio) diethyl sulfonate may be subsequently esterified with may be used as the sole polyolefin composition stabilizer, or they may be used in conjunction with conventional, known phenolic antioxidants.

The stabilized polyolefin compositions of this invention may conveniently be made by any of the conventional mastication processes or other known ways of incorporating stabilizers in polyolefins may be utilized. For example, a satisfactory method of producing stabilized polyolefin compositions is to tumble blend the ingredients with the polyolefin and then to extrude the mixture so obtained. This method is most advantageously employed where all of the polyolefin compositions are powders. Another satisfactory method for mixing the stabilizing ingredients and the polyolefin is to add a solution of the stabilizing components to the polyolefin powder and then to remove the solvent for the stabilizing components by evaporation.

The preferred stabilized polyolefin compositions of this invention contain conventional phenolic antioxidants as well as the β-thioethyl sulfones. The sulfones and the phenolic antioxidant appear to exert a synergistic stabilizing effect, as has been noted to occur with phenolic antioxidants and the known thioethers which have been previously used in polyolefin compositions.

Any one of the large number of hindered phenols known to function as stabilizers in polyethylene and other polymers may be used. Such hindered phenols are the 2,4,6-trialkyl phenols, the alkylated bisphenols, and the alkylated trisphenols.

The stabilized polyolefin compositions of this invention may also contain other stabilizers, such as materials which will absorb ultraviolet light. In addition, the stabilized polyolefin compositions may contain other conventional adjuvants such as processing aids, for example, the soaps of calcium and zinc, and also other materials such as pigments, dyes and fillers. Carbon black may be incorporated either as an absorbent or ultraviolet light or as a pigment.

The stabilized polyolefin compositions of the present invention exhibit improved stability and more particularly, improved stability against oxidative deterioration resulting from exposure to elevated temperatures. In addition, the stabilized polyolefin compositions of this invention exhibit enhanced stability against deterioration resulting from exposure to sunlight or ultraviolet light. Polyolefins stabilized in accordance with the present invention have extended life expectancies and can be used more effectively than unstabilized polyolefins for a wide diversity of uses. For example, the stabilized polyolefins compositions of this invention can be cast, extruded, rolled, or molded into sheets, rods, tubes, pipes, filaments or other shaped articles, and they may also be used for coating a wide variety of substrates.

The invention will be more readily understood with reference to the following examples, which are intended to illustrate but not limit the scope of the invention.

EXAMPLE 1

(Preparation of didodecyl ester of β,β'-bis (carboxymethylthio) diethyl sulfone)

To a stirred mixture of 130.2 g. (0.5 mole) lauryl thioglycollate and 5 g. sodium carbonate was added dropwise 29.5 g. (0.25 mole) divinyl sulfone. During the 20 minute addition period, the exothermic reaction was maintained below 100° C. with external cooling and subsequently the reaction mixture was heated to 85° C. for three hours. The reaction mixture, which solidified on cooling, was dissolved in methanol, treated with Nuchar C-190, filtered and allowed to cool. The product, which crystallized, was collected by suction filtration and dried; M.P. 62–64° C. Calculated for $C_{32}H_{62}O_6S_3$ (percent): C, 60.09; H, 9.70; S, 15.02. Found (percent): 58.20; H, 9.14; S, 15.00.

EXAMPLE 2

(Preparation of dioctadecyl ester of β,β'-bis (carboxymethylthio) diethyl sulfone)

The reaction of octadecyl thioglycollate and divinyl sulfone was carried out in the same manner as described in Example 1. The product was recrystallized from methanol; M.P. 74–75° C. Calculated for $C_{44}H_{86}O_6S_3$ (percent): C, 65.43; H, 10.66; S, 11.90. Found (percent): C, 66.37; H, 10.75; S, 12.28.

EXAMPLE 3

(Preparation of β,β'-bis (2-carboxyethylthio) (diethyl sulfone))

To a stirred mixture of 106 g. (1 mole) 3-mercaptopropionic acid, 5 g. sodium carbonate, and 100 ml. toluene was added dropwise 59 g. (0.5 mole) divinyl sulfone. Following a 45 minute addition period, during which time there was no appreciable temperature rise, the reaction mixture was heated to reflux for two hours. The product, which crystallized on cooling, was collected by suction filtration and recrystallized from methanol; M.P. 179–180° C. The neutralization equivalent of the product was 169.7 versus the value calculated for $\beta,\beta'$-bis (2-carboxyethylthio) diethyl sulfone of 165.23.

EXAMPLE 4

(Preparation of didodecyl ester of $\beta,\beta'$-bis (2-carboxyethylthio) diethyl sulfone)

A mixture of 82.6 g. of (0.25 mole) of the $\beta,\beta'$-bis (2-carboxyethylthio) diethyl sulfone obtained as described in Example 3, 200 g. (1.08 mole) dodecyl alcohol, and 8 g. potassium bisulfate were heated at 150° C. and 90 mm. pressure for four hours. The cooled reaction product was washed with 5% sodium carbonate solution, collected by suction filtration, and recrystallized from isopropanol; M.P. 76–78° C. Calculated for $C_{34}H_{66}O_6S_3$ (percent): C, 61.20; H, 9.99; S, 14.42. Found (percent): C, 61.88; H, 10.02; S, 13.31.

EXAMPLE 5

(Preparation of ditetradecyl ester of $\beta,\beta'$-bis (2-carboxyethylthio) diethyl sulfone)

The esterification of $\beta,\beta'$-bis (2-carboxyethylthio) diethyl sulfone with tetradecyl alcohol was carried out in the same manner as described in Example 4. The product was collected and recrystallized from methanol; M.P. 88–89° C. Calculated for $C_{38}H_{74}O_6S_3$ (percent): C, 63.10; H, 10.33; S, 13.30. Found (percent): C, 62.13; H, 10.05; S, 13.11.

EXAMPLE 6

(Preparation of dioctadecyl ester of $\beta,\beta'$-bis (2-carboxyethylthio) diethyl sulfone)

The esterification of $\beta,\beta'$-bis (2-carboxyethylthio) diethyl sulfone with octadecyl alcohol was carried out in the same manner as described in Example 4. The product was collected by suction filtration and recrystallized from benzene; M.P. 92–94° C. Calculated for $C_{46}H_{90}O_6S_3$ (percent): C, 66.12; H, 10.88; S, 11.51. Found (percent): C, 66.46; H, 10.40; S, 11.51.

EXAMPLE 7

(Preparation of dipotassium salt of $\beta,\beta'$-bis (2-carboxyethylthio) diethyl sulfone)

To a solution of 9.0 g. (0.17 mole) potassium hydroxide in 20 ml. methanol was added 26.4 (0.08 mole) $\beta,\beta'$-bis (2-carboxyethylthio) diethyl sulfone prepared by the process of Example 3. The mixture was heated at 60° C. with stirring for 2 hours, cooled to 25° C., and filtered by suction filtration. Following a methanol wash, the dried product exhibited a decomposition point above 225° C.

EXAMPLE 8

(Preparation of monopotassium salt of $\beta,\beta'$-bis (2-carboxyethylthio) diethyl sulfone)

In a manner similar to Example 7, the reaction of $\beta,\beta'$-bis (2-carboxyethylthio) diethyl sulfone with potassium hydroxide at a 1:1 molar ratio was carried out in methanol. The monopotassium salt so obtained decomposed above 225° C.

EXAMPLE 9

(Preparation of disodium salt of $\beta,\beta'$-bis (2-carboxyethylthio) diethyl sulfone)

In a manner similar to Example 7, the reaction of $\beta,\beta'$-bis (2-carboxyethylthio) diethyl sulfone with sodium hydroxide (1:2 molar ratio) was carried out in methanol. The disodium salt decomposed above 225° C.

EXAMPLE 10

(Preparation of monosodium salt of $\beta,\beta'$-bis (2-carboxyethylthio) diethyl sulfone)

In a manner similar to Example 7, the reaction of $\beta,\beta'$-bis (2-carboxyethylthio) diethyl sulfone with sodium hydroxide (1:1 molar ratio) was carried out in methanol. The monosodium salt decomposed above 240° C.

EXAMPLE 11

(Preparation of calcium salt of $\beta,\beta'$-bis (2-carboxyethylthio) diethyl sulfone)

To a heated solution of 30 g. (0.08 mole) of disodium salt of $\beta,\beta'$-bis (2-carboxyethylthio) diethyl sulfone, prepared by the process of Example 9, in 150 ml. water was added a solution of 8.9 g. (0.008 mole) calcium chloride in 150 ml. of water. The final solution was heated at 85° C. with stirring for 5 hours during which time a precipitate was formed. The mixture was cooled and the product collected by suction filtration, exhibited a decomposition point above 280° C.

EXAMPLE 12

(Preparation of $\beta,\beta'$-bis (2-hydroxyethylthio) diethyl sulfone

To a mixture of 78.0 g. (1 mole) 2-mercaptoethanol, 400 ml.; toluene and 5.0 g. sodium carbonate, heated at 95° C., was added 58 g. (.49 mole) divinyl sulfone during at 1 hour period. Following the addition, the reaction mixture was heated at reflux for 1 hour and then filtered hot (80° C.). On cooling the product which crystallized was collected by suction filtration and recrystallized from isopropanol, M.P. 82–84° C. Calculated for $C_8H_{18}O_4S_3$ (percent): C, 35.04; H, 6.75; S, 35.04. Found (percent): C, 34.89; H, 6.40; S, 34.92.

EXAMPLE 13

(Preparation of dilauric acid ester of $\beta,\beta'$-bis (2-hydroxyethylthio) diethyl sulfone)

A mixture of 24.5 g. (.09 mole) $\beta,\beta'$-bis (2-hydroxyethylthio) diethyl sulfone prepared by the process of Example 12, 50 g. (.25 mole) lauric acid, and 5 g. potassium bisulfate was heated at 165° C. and 25 mm. pressure for 5 hours. Following this esterification reaction, the product was cooled and recrystallized from isopropanol, M.P. 93–95° C. Calculated for $C_{32}H_{62}O_6S_3$ (percent): S, 15.05. Found (percent): S, 15.27.

EXAMPLE 14

(Preparation of $\beta,\beta'$-bis (2-benzothiazoylthio) diethyl sulfone)

To a mixture of 75 g. (.45 mole) 2-mercaptobenzothiazole, 250 ml. toluene, and 5 g. sodium carbonate heated to 90° C. was added 25 g. (21 mole) divinyl sulfone. During the 30 minute addition period the temperature of the reaction mixture decreased to 60° C. The reaction mixture was heated to reflux for 1 hour and then cooled. The viscous oil thus obtained, crystallized on standing for approximately 2 weeks and was then recrystallized from acetone, M.P. 114–116° C. Calculated for $C_{18}H_{28}N_2O_2S_5$ (percent): N, 6.02. Found (percent): N, 5.98.

EXAMPLE 15

(Preparation of $\beta$-(4-t-butyl-2-methylphenylthio) propyl-p-tolyl sulfone)

A stirred mixture of 29.3 g. (0.2 mole) allyl p-tolyl sulfone, 42.0 g. (0.23 mole) 4-t-butyl-o-thiocresol, and 0.5 g. sodium methoxide was heated at 95° C. for 4 hours. The product, obtained as a pale, yellow oil, was neutralized with dilute aqueous hydrochloric acid, washed with water, and dried. Iodometric titration indicated less than 0.5% mercaptan. Vapor phase chromatography confirmed the essentially pure product. Calculated for $C_{21}H_{28}O_2S_2$ (percent): S, 17.02. Found (percent): S, 16.15.

What is claimed is:

1. β-Thioethyl sulfones of the formula:

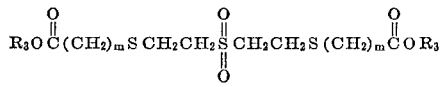

wherein $R_3$ is selected from the group consisting of hydrogen atoms, alkaline earth metals, alkali metals, alkyl radicals of from 6 to 22 carbon atoms in length alkaryl radicals, and aryl radicals and $m$ is 1 to 4.

2. Thioethyl sulfones as claimed in claim 1 wherein said sulfone is the didodecyl ester of β,β'-bis (carboxymethyl thio) diethyl sulfone.

3. Thioethyl sulfones as claimed in claim 1 wherein said sulfone is the dioctadecyl ester of β,β'-bis (carboxymethyl thio) diethyl sulfone.

4. Thioethyl sulfones as claimed in claim 1 wherein said sulfone is the didodecyl ester of β,β'-bis (2-carboxyethyl thio) diethyl sulfone.

5. Thioethyl sulfones as claimed in claim 1 wherein said sulfone is the ditetradecyl ester of β,β'-bis (2-carboxyethyl thio) diethyl sulfone.

6. Thioethyl sulfones as claimed in claim 1 wherein said sulfone is the dioctadecyl ester of β,β'-bis (2-carboxyethyl thio) diethyl sulfone.

References Cited

UNITED STATES PATENTS 2,870,215   1/1959   Davis _____ 260—607

LORRAINE A. WEINBERGER, Primary Examiner

E. J. GLEIMAN, Assistant Examiner

U.S. Cl. X.R.

260—479 S, 537 S